(12) United States Patent
Kim et al.

(10) Patent No.: US 9,488,985 B2
(45) Date of Patent: Nov. 8, 2016

(54) METHOD FOR CONSTRUCTING AIR-OBSERVED TERRAIN DATA BY USING ROTARY WING STRUCTURE

(71) Applicant: DURETEK INC., Daejeon (KR)

(72) Inventors: Hyungse Kim, Daejeon (KR); Jaemin Song, Daejeon (KR); Junkyu Kim, Daejeon (KR); Jihwan An, Gyeonggi-do (KR)

(73) Assignee: Duretek Inc., Daejeon (KR)

( * ) Notice: Subject to any disclaimer, the term of this patent is extended or adjusted under 35 U.S.C. 154(b) by 0 days.

(21) Appl. No.: 14/646,329

(22) PCT Filed: May 9, 2014

(86) PCT No.: PCT/KR2014/004178
§ 371 (c)(1),
(2) Date: May 20, 2015

(87) PCT Pub. No.: WO2015/005573
PCT Pub. Date: Jan. 15, 2015

(65) Prior Publication Data
US 2016/0132057 A1    May 12, 2016

(30) Foreign Application Priority Data
Jul. 9, 2013    (KR) ........................ 10-2013-0080267

(51) Int. Cl.
*G05D 1/00*    (2006.01)
*B64D 47/08*    (2006.01)
*G05D 1/10*    (2006.01)
(Continued)

(52) U.S. Cl.
CPC ........... *G05D 1/0094* (2013.01); *B64C 39/024* (2013.01); *B64D 47/08* (2013.01); *G01C 11/02* (2013.01); *G05D 1/0011* (2013.01);
(Continued)

(58) Field of Classification Search
USPC ............................................................ 701/2
See application file for complete search history.

(56) References Cited

U.S. PATENT DOCUMENTS

| | | | | |
|---|---|---|---|---|
| 2005/0177307 A1* | 8/2005 | Greenfeld | ................. | F41G 5/14 701/409 |
| 2008/0273753 A1* | 11/2008 | Giuffrida | ............... | G01C 11/02 382/103 |
| 2009/0157233 A1* | 6/2009 | Kokkeby | .............. | G01S 3/7864 701/3 |

FOREIGN PATENT DOCUMENTS

| | | |
|---|---|---|
| KR | 100587405 | 6/2006 |
| KR | 100671504 | 1/2007 |
| KR | 1020110000767 | 1/2011 |

*Primary Examiner* — Anne M Antonucci
(74) *Attorney, Agent, or Firm* — I P & T Group LLP (57) ABSTRACT

A method for constructing air-observed terrain data by using a rotary wing structure includes setting flight information including a photographing starting location and a photographing ending location on the basis of a flight route and a photographing location of the rotary wing structure; transmitting, to the rotary wing structure, the flight information so as to store the flight information in a flight control unit; capturing a ground image by a photographing unit of the rotary wing structure and storing the ground image in a storage unit when the rotary wing structure arrives at the photographing location; ending photographing and returning to the ground when the rotary wing structure arrives at the photographing ending location while repeatedly capturing a ground image; and constructing, by a computer in the control center, terrain data by using ground images stored in the storage unit.

5 Claims, 6 Drawing Sheets

(51) Int. Cl.
*B64C 39/02* (2006.01)
*G01C 11/02* (2006.01)

(52) U.S. Cl.
CPC ........ *G05D 1/102* (2013.01); *B64C 2201/024* (2013.01); *B64C 2201/123* (2013.01)

METHOD FOR CONSTRUCTING AIR-OBSERVED TERRAIN DATA BY USING ROTARY WING STRUCTURE

This application is a national stage application of PCT/KR2014/004178 filed on May 9, 2014, which claims priority of Korean patent application number 10-2013-0080267 filed on Jul. 9, 2013. The disclosure of each of the foregoing applications is incorporated herein by reference in its entirety.

TECHNICAL FIELD

The present invention relates to a method for constructing air-observed terrain data by using a rotary wing structure, and more particularly, to a method for constructing air-observed terrain data by using a rotary wing structure, which appropriately controls the rotary wing structure so that a ground image photographed in the air using the rotary wing structure has proper resolution and a series of images, and synthesizes the obtained ground images, thereby constructing terrain data.

BACKGROUND ART

For various purposes such as military, construction and environmental protection, the necessity of a ground image obtained through aerial photographing is gradually increased. A flight vehicle having a camera is used in the aerial photographing. In the related art, when the ground image is obtained, a fixed wing flight vehicle having a camera performs a photographing operation, while flying along a preset flight route.

However, when the aerial photographing is performed using the fixed wing flight vehicle, first, a photographing area and the flight route which can cover the entire photographing area are set, and then, while the fixed wing flight vehicle flies along the preset flight route, the camera is operated so as to obtain the ground image. In general, since the fixed wing flight vehicle flies at a high speed, and cannot stay in the air, the obtained image is verified after a flight of the fixed wing flight vehicle is finished. When there is something wrong with the obtained ground image, or a target object is not photographed properly, the fixed wing flight vehicle should fly again over the entire photographing area so as to obtain a proper image.

Furthermore, even when the fixed wing flight vehicle flies again to rephotograph a place corresponding to the defected ground image, it is very difficult to obtain an image of the same position as a previously photographed position, or to perform a photographing operation under the same conditions as previous photographing conditions, because the fixed wing flight vehicle cannot stay at a certain position. Therefore, to construct terrain data with respect to one photographing area, it might be necessary to repeatedly perform the flight of the flight vehicle several times, and thus it can be costly and time-consuming.

DISCLOSURE

Technical Problem

The present invention is directed to providing a method for constructing air-observed terrain data by using a rotary wing structure, which is capable of performing a photographing operation, while staying at a certain position, and also easily performing a rephotographing operation, when an obtained ground image is defective.

Technical Solution

One aspect of the present invention provides a method for constructing air-observed terrain data by using ground images obtained by a camera installed at a rotary wing structure, the method including a flight route and photographing location setting step of calculating a flight route and a photographing location of the rotary wing structure based on a flight altitude and coordinates for dividing a predetermined area, which are inputted from a ground control center, and designating and setting step of designating and setting a photographing starting location and a photographing ending location based on the calculated flight route and photographing location; a flight information receiving and storing step of transmitting, to the rotary wing structure, flight information set in the flight route and photographing location setting step so as to store the flight information in a flight control unit; an aerial photographing and image storing step of capturing the ground image by a photographing unit of the rotary wing structure and storing the ground image in a storage unit when the rotary wing structure flies according to the flight information stored in the flight control unit thereof and arrives at the photographing location; a photographing ending and returning step of repeatedly performing the aerial photographing and image storing step, and ending the photographing and returning the rotary wing structure to the ground when the rotary wing structure arrives at the photographing ending location; and an image verifying and synthesizing step of constructing the terrain data in a computer of the control center using the ground images stored in the storage unit.

The flight route and photographing location setting step may further include an inspecting-before-flight step of inspecting whether the rotary wing structure and the photographing unit are normal on the ground before the flight.

The method may further include a defective image photographing information administrating step of administrating a photographing location and a condition in which a defective image of the photographed images is photographed after the image verifying and synthesizing step.

The defective image photographing information administrating step may further include an image rephotographing and storing step in which the rotary wing structure automatically flies to the photographing location in which the defective image is photographed, and photographs and stores an image of the corresponding location.

The image obtained by the rotary wing structure may be transmitted to a computer of the ground control center through wireless communication, and the computer of the ground control center may upload and display cadastral information stored in a cadastral database on the transmitted ground image, and thus may verify whether the cadastral information of a cadastral map coincides with actual cadastral information in real time.

[Detailed Description of Main Element]

| | |
|---|---|
| 1: rotary wing structure | 10: main body |
| 11: support fixture | 12: driving motor |
| 13: rotary wing | 14: distinguishing part |
| 20: flight control unit | 21: main frame |
| 22: photographing control unit | 23: storage unit |
| 24: administration unit | 25: first integrated sensors |
| 26: second integrated sensors | 30: photographing unit |
| 40: ground control center | A: photographing area |
| H: altitude | P: photographing route |
| S: photographing location | W: image photographing width |

MODES OF THE INVENTION

Hereinafter, the present invention will be described in detail with reference to the accompanying drawings illustrating exemplary embodiments.

Figure 1:
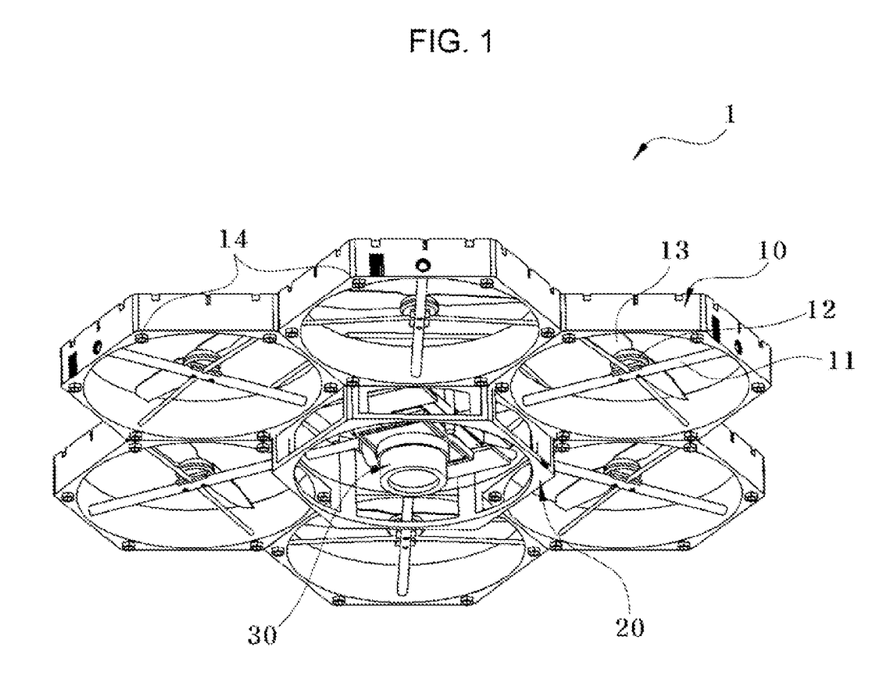
FIG. 1 is a perspective view illustrating an example of a rotary wing structure according to the present invention.

The present invention relates to a method for constructing air-observed terrain data, in which ground images are obtained by an aerial photographing step of using a camera installed at the rotary wing structure, and then synthesized so as to construct the air-observed terrain. As illustrated in FIG. 1, the rotary wing structure 1 includes a main body 10, a flight control unit 20, and a photographing unit 30, and a flight route and altitude and a photographing area of the rotary wing structure 1 are set and controlled by a ground control center 40.

The main body 10 of the present invention has a structure in which a plurality of hollow frame having a hexagonal shape and formed of a metallic or synthetic resin material are connected with each other to be adjacent to each other, and a support fixture 11 is installed at a hollow portion of each frame, and a driving motor 12 is installed on the support fixture 11, and a rotary wing 13 is installed at a rotating shaft (not designated by a reference numeral) of the driving motor 12, and power for driving the driving motor 12 is supplied by a battery (not shown) installed at the main body 10.

A rotation of each driving motor 12 is controlled by the flight control unit 20 to be described later, and thus the rotary wing structure 1 flies at a predetermined speed and in a predetermined direction.

A plurality of distinguishing parts 14 configured with LEDs or the like so as to easily distinguish a current position of the rotary wing structure 1 when the rotary wing structure 1 flies at night are installed at a lower surface of the main body 10.

Figure 2:
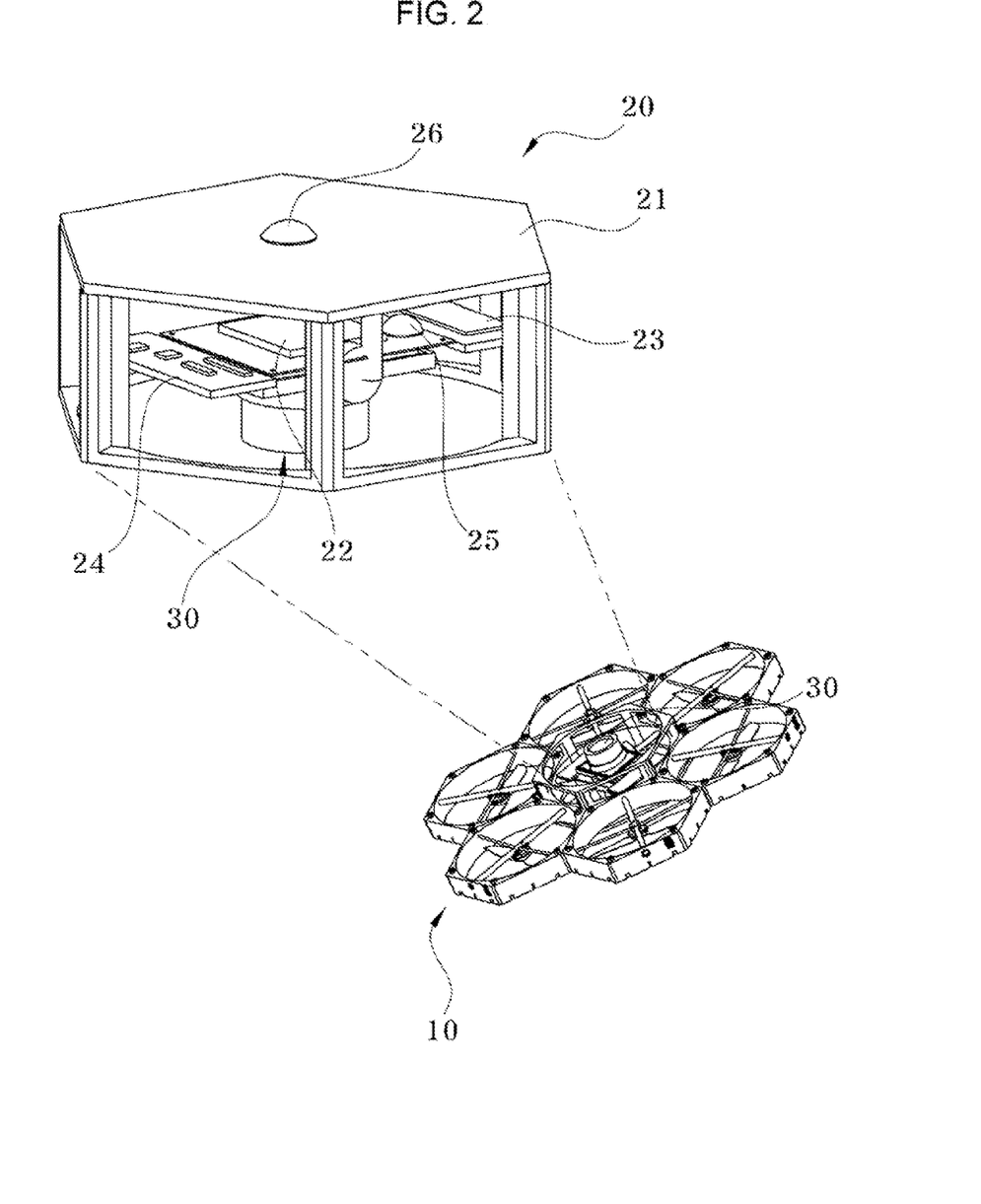
FIG. 2 is a perspective view illustrating an example of a photographing unit of the rotary wing structure according to the present invention.

The flight control unit 20 is installed at a center portion of the main body 10. The flight control unit 20 controls a rolling, pitching and yawing motion of the rotary wing structure 1, and thus allows the rotary wing structure 1 to fly stably. As illustrated in FIG. 2, the flight control unit 20 includes a main frame 21 formed to have a hexagonal shape and a predetermined height, a photographing control unit 22 installed in the main frame 21 to calculate and control a shutter speed and an aperture of the photographing unit 30 to be described later, a storage unit 23 installed at one side of the photographing control unit 22 so as to stores the images photographed by the photographing unit 30, an administration unit 24 installed at the other side of the photographing control unit 22 so as to transmit flight information of the rotary wing structure 1 to the ground control center 40, a first integrated sensors 25 (including temperature, density, wind speed, humidity, dust concentration and illumination sensors) configured to detect real-time weather information and to transmit the detected real-time weather information to the storage unit 23, and a second integrated sensors 26 (including a GPS receiver, an altitude sensor and an atmospheric pressure sensor). A wireless transmitter-receiver is provided at the administration unit 24 so as to wirelessly communicate with the ground control center 40.

The photographing control unit 22 controls the shutter speed and the aperture of the photographing unit 30 based on the real-time weather information provided from the first integrated sensors 25.

The photographing unit 30 is installed at a lower surface of the flight control unit 20 so as to obtain the ground image. To this end, the camera having the predetermined number of pixels is installed at the photographing unit 30. If necessary, the camera may have a detachable structure and thus may be replaced with another camera having the different number of pixels.

Also, the ground control center 40 which controls the flight of the rotary wing structure 1 is located at the ground. The ground control center 40 sets the photographing area, the flight route, the photographing location or the like, and then transmits them to the rotary wing structure 1 through wireless communication. To this end, the ground control center 40 has a computer, a monitor and the wireless transmitter-receiver. The computer of the ground control center 40 may be connected with a cadastral database provided at a cadastral survey corporation, and thus may obtain a cadastral map or the like stored in the cadastral database in real time.

Hereinafter, a method of constructing the terrain data using the rotary wing structure 1 having the above-described configuration will be described.

Figure 3:
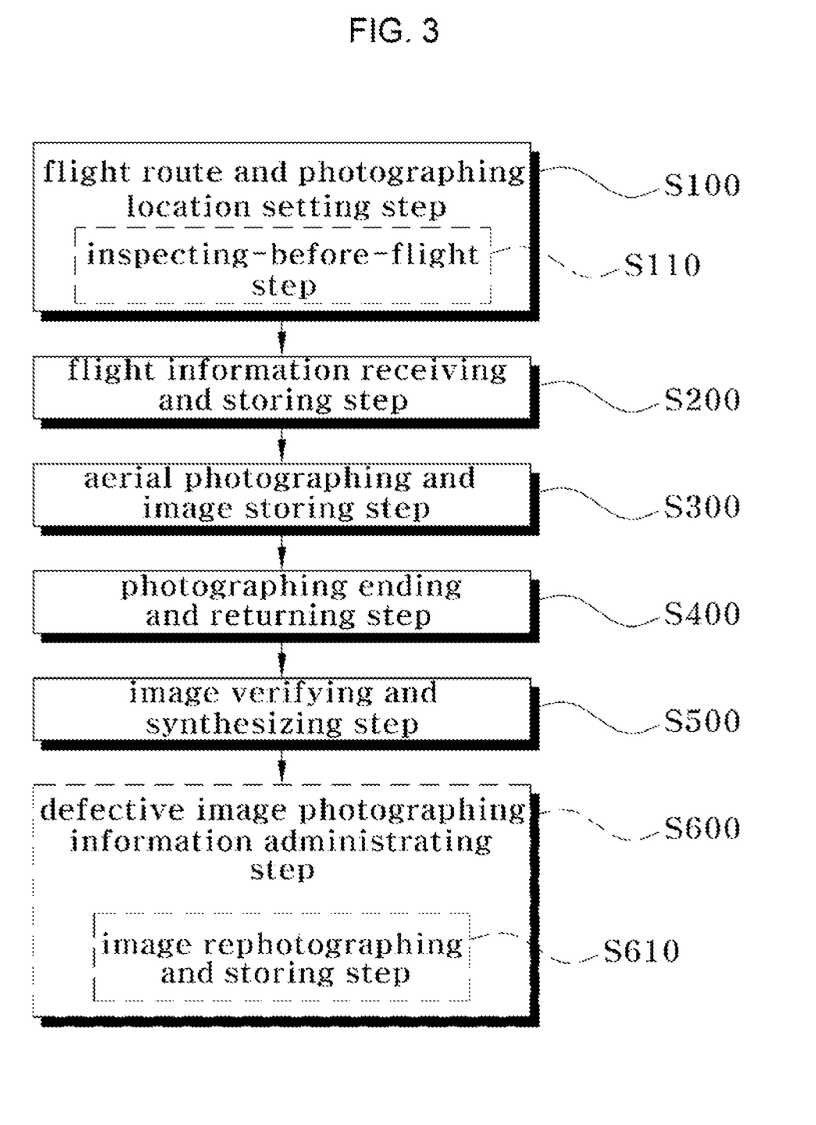
FIG. 3 is a flowchart illustrating a method for constructing air-observed terrain data by using a rotary wing structure according to the present invention.

As illustrated in FIG. 3, the method of constructing the terrain data according to the present invention includes a flight route and photographing location setting step S100, a flight information receiving and storing step S200, an aerial photographing and image storing step S300, a photographing ending and returning step S400, and an image verifying and synthesizing step S500.

(1) The Flight Route and Photographing Location Setting Step S100

In this step of, the flight route, the photographing location and the flight altitude or the like of the rotary wing structure 1 are set at the ground control center 40 to obtain a ground image. The flight route, the photographing location and the flight altitude or the like set by this step of is input to the flight control unit 20 via the administration unit 24 of the rotary wing structure 1 through the wireless communication, and the flight control unit 20 controls the flight and the photographing step of the rotary wing structure 1 base on the transmitted information.

The flight altitude H is appropriately determined according to required resolution with respect to the ground image.

Figure 4:
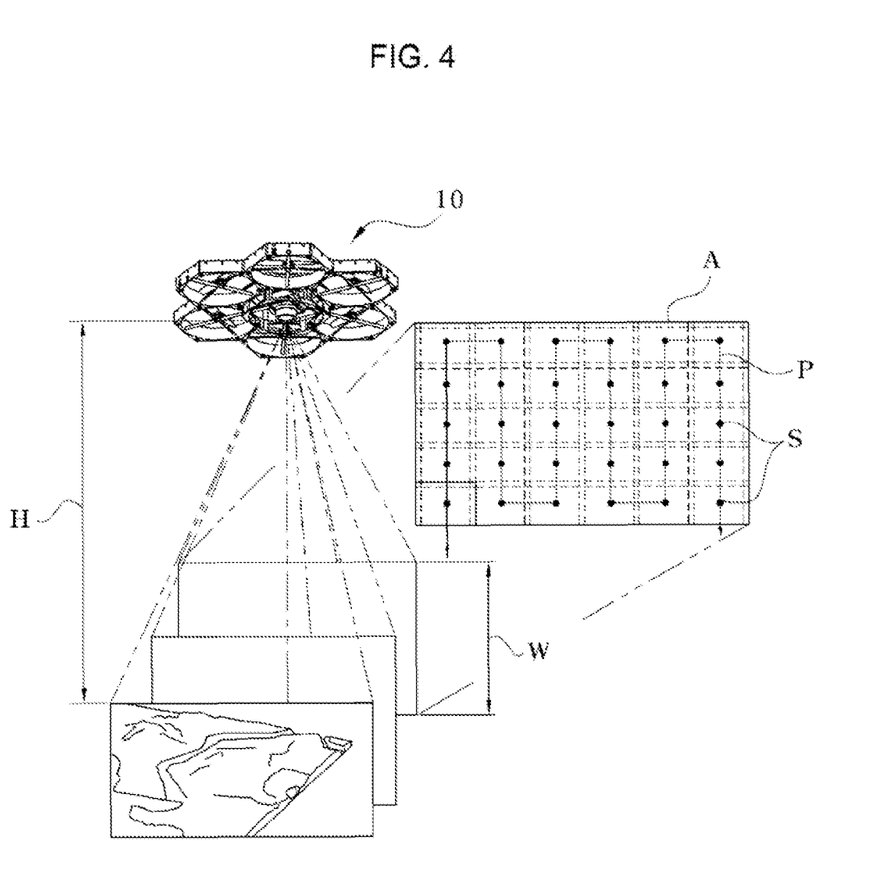
FIG. 4 is a process diagram illustrating an example of analyzing a flight altitude of a photographing unit and an appropriate photographing area (surface area) according to the present invention.

In a method of setting the flight route P, the photographing location S and the flight altitude H at the computer of the ground control center 40, first, when a user inputs coordinates for dividing a predetermined area, i.e., positions (latitude and longitude) of a left lower point and a right upper point, a quadrangular photographing area A is set, as illustrated in FIG. 4. In this state, when the flight altitude is input, a software installed in the computer of the ground control center 40 divides the photographing area A into several sections according to an image photographing width W based on information of the camera installed at the photographing unit 30 and the inputted flight altitude, and then calculates coordinates (latitude and longitude) of a center point of each section, and thus the flight route P is calculated by connecting the center points.

The center point of each section is a position in which the image is obtained through the camera, i.e., the photographing location S. A photographing starting location and a photographing ending location are set based on the basis of the calculated flight route (P) and photographing location (S), and the flight information such as the flight altitude H, the flight route P, the photographing location S, the photographing starting location and the photographing ending location set as described above is transmitted to the rotary wing structure 1 through the wireless communication.

Figure 5:
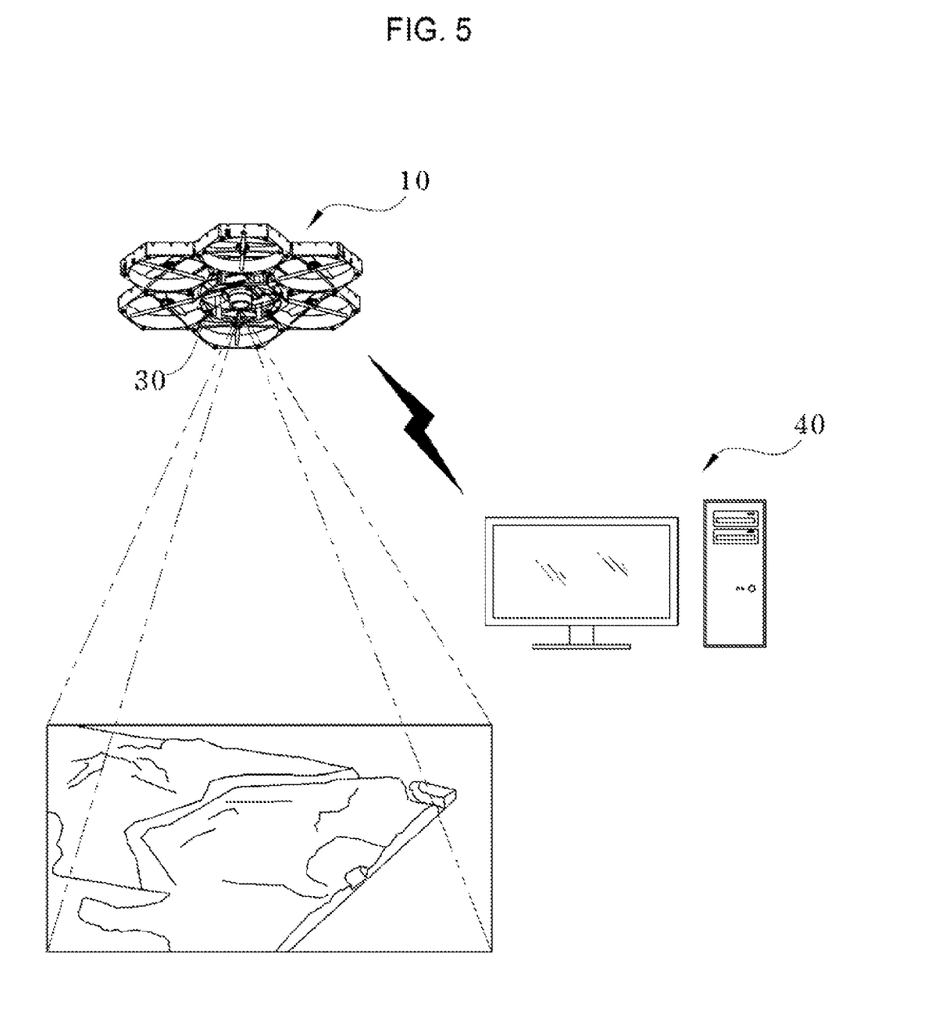
FIG. 5 is a view illustrating a system configuration for constructing the air-observed terrain data by using the rotary wing structure according to the present invention.

As illustrated in FIG. 5, the sections are set so as to be partly overlapped with each other, and thus the terrain data may be constructed by easily connecting a plurality of obtained ground images.

Meanwhile, an inspecting-before-flight step S110 may be further added before flight route and photographing location setting step S100 is performed. In this step, it is checked before the flight whether the rotary wing structure 1 breaks down and whether the photographing unit installed at the rotary wing structure 1 is abnormal.

(2) The Flight Information Receiving and Storing Step S200

In this step, when the flight information such as the flight altitude, the flight route and the photographing location is transmitted from the ground control center 40 to the rotary wing structure 1 by the flight route and photographing location setting step S100, the flight information is received and stored in the flight control unit 20 of the rotary wing structure 1.

(3) The Aerial Photographing and Image Storing Step S300

In this step, in the case in which the flight information is received and stored in the flight control unit 20 of the rotary wing structure 1 by the flight information receiving and storing step S200, when the rotary wing structure 1 flies along the flight route set based on the stored flight information and arrives at each photographing location S, the rotary wing structure 1 stays at the photographing location 5, and the ground images are photographed and obtained using the photographing unit 30, and then the obtained ground images are stored in the storage unit 23.

When the ground images are stored in the storage unit 23 by the above-described steps, a photographing speed and an exposure degree of the camera, and the weather information such as the illumination and the wind speed detected by the first integrated sensors 25, as well as the flight information such as a current flight altitude and flight route of the rotary wing structure 1 are also stored.

(4) The Photographing Ending and Returning Step S400

In this step, when the rotary wing structure 1 arrives at the photographing ending location, and all of the ground images with respect to the photographing area A are obtained by the aerial photographing and image storing step S300, the rotary wing structure 1 is returned to the ground according to the settings set by the ground control center 40. When the rotary wing structure 1 is returned to the ground, the plurality of ground images stored in the storage unit 23 are collected and then stored in the computer of the ground control center 40 in which a software for constructing the terrain data is installed.

(5) The Image Verifying and Synthesizing Step S500

In this step, when the ground images obtained by the aerial photographing and image storing step S300 are inspected to check whether the obtained ground images are abnormal, and the obtained ground images are normal, the ground images are analyzed, synthesized and controlled through an image processing process using the software in the computer of the ground control center 40 for constructing the terrain data.

Due to vibration or the like of the rotary wing structure 1, the obtained ground images may include a defective image which may not be used. The defective image is administrated by a defective image photographing information administrating step S600.

Here, in the defective image photographing information administrating step S600, the ground image including the defective image is stored in the flight control unit 20 along with the flight information via the aerial photographing and image storing step S300. Therefore, in an image rephotographing and storing step S610, the rotary wing structure 1 flies again based on the stored information so as to be located at the same photographing location S, and then the image verifying and synthesizing step S500 is performed again so as to complete a construction of the terrain data. Therefore, in the present invention, even when a part of the ground images is defective, the rotary wing structure 1 does not need to fly again over the entire photographing area, but may be returned to the photographing location S in which the defective image is obtained, and then may perform the rephotographing operation under the same conditions as previous photographing conditions. Therefore, the present invention may have excellent reproducibility and also may easily and rapidly obtain the ground images for constructing the terrain data.

Figure 6:
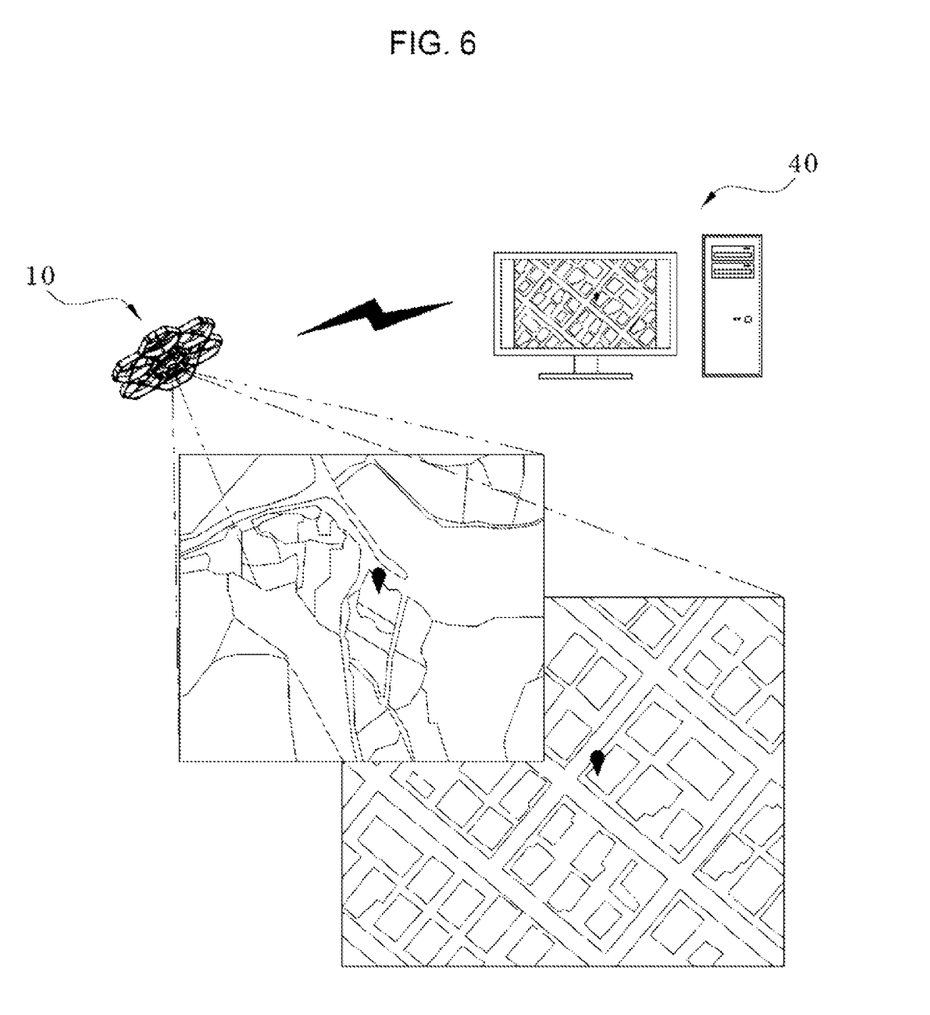
FIG. 6 is a view illustrating an example of retrieving and verifying a cadastral and woodland map and a real-time aerial image according to the present invention.

Until now, the method for constructing the air-observed terrain data by using the rotary wing structure 1 has been described. However, the rotary wing structure 1 may be used to compare cadastral information indicated in the cadastral map with actual cadastral information. In this case, the ground image obtained by the rotary wing structure 1 is transmitted to the computer of the ground control center 40 through the wireless communication, and the computer of the ground control center 40 may upload and display the cadastral information stored in the cadastral database on the transmitted ground image, and thus may verify whether the cadastral information of the cadastral map coincides with the actual cadastral information in real time.

INDUSTRIAL APPLICABILITY

According to the present invention as described above, the ground images for constructing the terrain data can be obtained using the rotary wing structure, and also, since the flight information and the photographing conditions when each of the ground images is photographed can be recorded and stored at the same time, and then can be used upon the rephotographing operation, it is possible to provide the excellent reproducibility, and also to easily and rapidly obtain proper ground images.

The invention claimed is:

1. A method for constructing air-observed terrain data by using a ground image obtained by a camera installed at a rotary wing structure, which is capable of performing a photographing operation while staying at a given position, the method comprising:
- a flight route and photographing location setting step of calculating a flight route and a photographing location of the rotary wing structure based on a flight altitude and coordinates for dividing a predetermined area, which are inputted from a ground control center;
- designating and setting step of designating and setting a photographing starting location and a photographing ending location based on the calculated flight route and photographing location at the ground control center;
- a flight information receiving and storing step of transmitting, from the ground control center to the rotary wing structure, flight information set in the flight route and photographing location setting step so as to store the flight information in a flight control unit;
- an aerial photographing and image storing step of capturing the ground image by a photographing unit of the rotary wing structure and storing the ground image in a storage unit when the rotary wing structure flies according to the flight information stored in the flight control unit thereof and arrives at the photographing location;
- a photographing ending and returning step of repeatedly performing the aerial photographing and image storing step, and ending the photographing and returning the rotary wing structure to the ground when the rotary wing structure arrives at the photographing ending location; and
- an image verifying and synthesizing step of constructing the terrain data in the computer of the ground control center using the ground images stored in the storage unit.

2. The method of claim 1, wherein the flight route and photographing location setting step further comprises an inspecting-before-flight step of inspecting whether the rotary wing structure and the photographing unit are normal on the ground before the flight.

3. The method of claim 1, further comprising a defective image photographing information administrating step of administrating a photographing location and a condition in which a defecting image of the photographed images is photographed after the image verifying and synthesizing step.

4. The method of claim 3, wherein the defective image photographing information administrating step further comprises an image rephotographing and storing step in which the rotary wing structure flies to the photographing location in which the defective image is photographed, and photographs and stores an image of the corresponding location.

5. The method of claim 1, wherein the image obtained by the rotary wing structure is transmitted to a computer of the ground control center through wireless communication, and the computer of the ground control center uploads and displays cadastral information stored in a cadastral database on the transmitted ground image, and thus verifies whether the cadastral information of a cadastral map coincides with actual cadastral information in real time.

* * * * *